3,351,168
AUTOMATIC FLUID TRANSMISSION
Walter H. Thorpe, 9403 Somerset Ave., Detroit, Mich. 48230
Filed Apr. 13, 1965, Ser. No. 447,750
4 Claims. (Cl. 192—61)

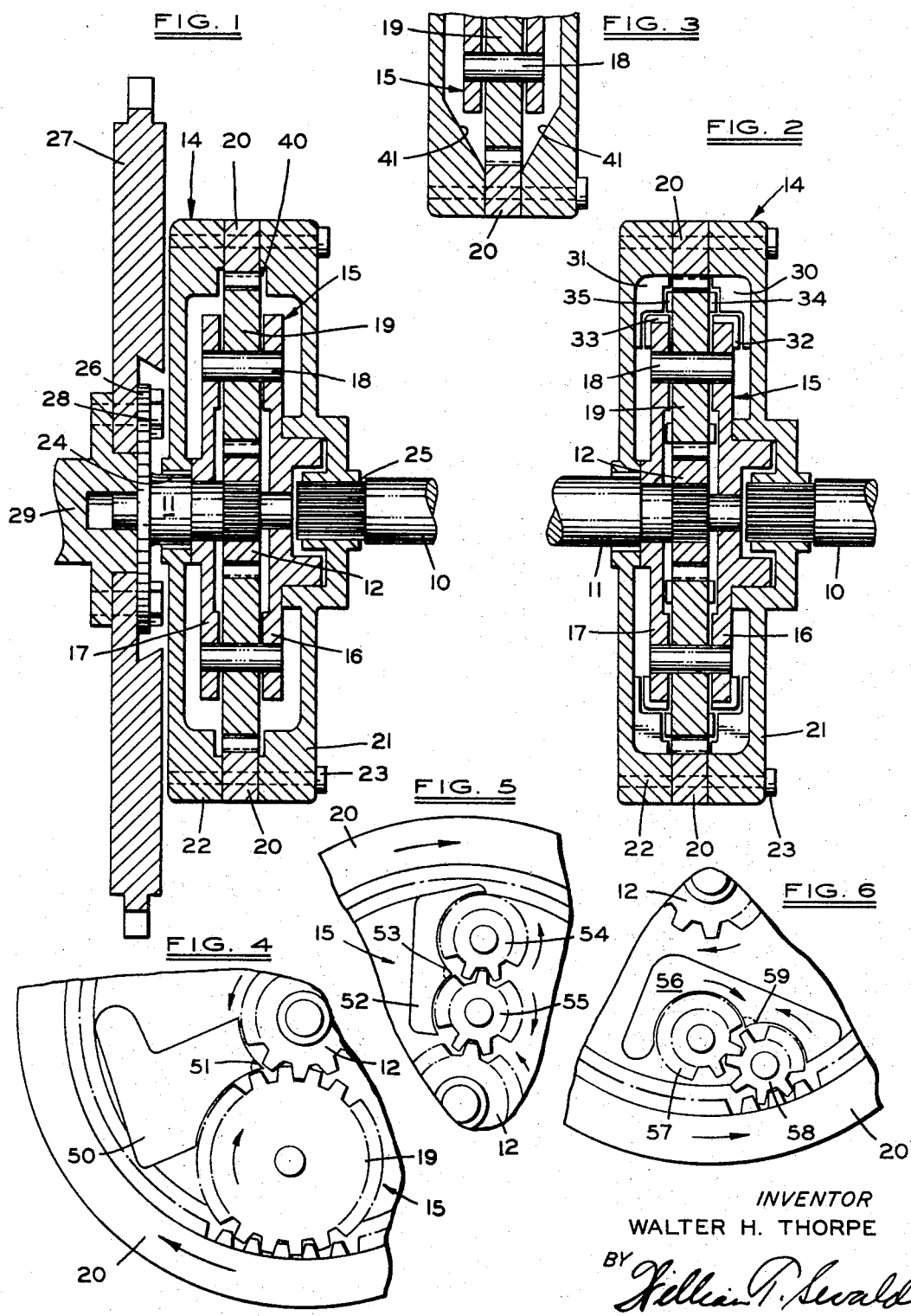

ABSTRACT OF THE DISCLOSURE

An automatic fluid transmission acting as a fluid clutch wherein the ring gear case, the planet gears and the planet gears carrier all have vanes to aid in the fluid clutching of the drive shaft to the driven shaft.

---

This invention relates to novel improvements in automatic planetary transmissions having a free floating planet carrier and planet gears and utilizing fluid as a reaction element to variably transfer speed and power between driving and driven elements by retarding free movement of the carrier and the planet gears.

The novel transmission has a fluid housing. The housing connects with a shaft. The housing carries a large ring gear. A planet carrier is freely bearinged in the housing. A sun gear lies in the housing. A shaft connects with the sun gear. A planet carrier lies between the sun gear and the ring gear. Planet gears are freely pinioned on the planet carrier The planet gears mesh with the sun gear and the ring gear. Relative motion between the sun gear and the ring gear is absorbed by the spinning and orbiting of the planet carrier and the planet gears. Fluid in the housing is used to impede the free spinning and orbiting of the planet carrier and the planet gears. The fluid gradually impedes their free spinning and orbiting. The fluid gradually impedes the planet gears from an initial condition of free spinning absorbing all relative movement between the sun gear and the ring gear, through an intermediate condition of partially impeded spinning absorbing partial relative movement between the sun and ring gear, to a final condition of no spinning not absorbing any relative movement between the sun and ring gear.

The direction of drive in the novel transmission is optional. Either shaft may be the drive shaft and the other shaft may be the driven shaft. Thus the sun gear and the ring gear may be either driving or driven. The planet gears are impeded by the fluid to act as the drive keys between the sun gear and the ring kear in either direction of drive. When the planet drive keys spin freely without impedance no drive is transferred. When the planet drive keys spin under partial impedance, partial drive is transferred. When the planet drive keys are impeded from spinning, full drive is transferred. The fluid is utilized to produce the desired impedance to the spinning of the planet gears.

The desired fluid impedance to the spinning of the planet gears is achieved by fluid jamming the teeth of meshing gears and/or by fluid contact with vanes on the gears, housing, and/or carrier, and/or by fluid jamming auxiliary gears mounted on the planet carrier. The desired fluid impedence produces the desired drive reaction in the planet gears. The drive reaction in the planet gears provides the desired drive conditions between the driving and driven elements.

With the foregoing in view, it is an object of the invention to provide an automatic transmission which is simple in design and construction, which is inexpensive to manufacture, which is light and compact, which is easy to use, which is dependable, and which does not add appreciably to the driven load especially under final drive conditions.

An object of the invention is to provide a freely floating rotating planet carrier and freely spinning planet gears on the carrier in a planetary system between a sun gear and a ring gear in a fluid housing containing fluid wherein drive is effected in either direction between the sun gear and the ring gear through the planet gears by the fluid impeding the spinning of the planet gears on a gradual basis so that drive is gradually applied between the driving and driven elements until the spinning of the planet gears is fully impeded thus using the planet gears as drive keys to transfer full drive between the driving and driven elements.

An object of the invention is to provide a transmission which transfers drive by means of fluid resistance in the teeth of the ring gear and in the teeth of the planet gears to displacement by the teeth of the mating gear thereby impeding the free spinning and orbiting of the planet gears.

An object of the invention is to provide a transmission wherein the centrifugal force developed by the rotation of the housing and ring gear packs the teeth of the ring gear and planet gears with fluid impeding the teeth of each in meshing with the other to impede the spinning and orbiting of the planet gears to produce drive reaction in the planet gears.

An object of the invention is to provide a transmission wherein the meshing teeth of the sun gear and planet gears are fluid jammed providing fluid impedance to the free spinning of the planet gears to effect drive reaction through the planet gears.

An object of the invention is to provide auxiliary gears on the planet carrier meshing with the ring gear and/or the sun gear and wherein the auxiliary gears are fluid jammed to impede rotation of the planet carrier which in turn impedes the free spinning of the planet gears to provide drive reaction via the planet gears.

An object of the invention is to provide fluid contacting and engaging vanes on the housing, planet carrier, and/or planet gears engaging and contacting the fluid in the housing for impeding relative rotation between the planetary elements to thereby produce drive reaction through the planet gears and also to provide fluid drive between the planetary elements to thereby transfer drive via the fluid.

An object of the invention is to provide a transmission having combined gradually reacted planetary drive characteristics and fluid drive characteristics singly and in combination.

An object of the invention is to provide a transmission and fluids therefore wherein the fluids may be liquids, semi-liquids particulated solids, pastes, oils, plastic compositions, etc., singly and in combination.

An object of the invention is to provide a transmission having characteristics which may be varied by using various kinds of fluids, which is adaptable and flexible to various types of drives, which may be constructed with various dimensions and in various sizes to suit particular uses, and which may be easily adapted for quick lock-up, medium delay lock-up, and/or long delayed lock-up as desired.

An object of the invention is to provide a transmission having desirable mechanical advantage during partially impeded spinning of the planet gears to assist bringing the driven member up to the speed of the driving member.

These and other objects of the invention will become apparent by reference to the following description of an automatic transmission embodying the invention taken in connection with the accompanying drawing in which:

FIG. 1 is a longitudinal cross-sectional view of a transmission embodying the invention showing the sun gear and housing connected to shafts and showing the planet carrier and planet gears freely rotatable.

FIG. 2 is a view similar to FIG. 1 showing vanes on the interior of the housing, the exterior of the planet carrier, and the planet gears.

FIG. 3 is a fragmentary cross-sectional view similar to FIGS. 1 and 2 showing a modification in the interior wall structure of the housing.

FIG. 4 is a fragmentary cross-sectional view in a plane normal to FIGS. 1 and 2, showing the locations of fluid impedance to the planet, ring, and sun gears.

FIG. 5 is a view similar to FIG. 4 showing a modification having auxiliary gears on the planet carrier driven by the sun gear; and FIG. 6 is a view similar to FIG. 5 showing a modification having auxiliary gears driven by the ring gear.

Referring now to FIGS. 1 and 2 of the drawing wherein like numerals refer to like and corresponding parts, the automatic transmission shown therein to illustrate the invention comprises a shaft 10 and a shaft 11 rotatably supported on the same axis. A sun gear 12 is splined to the shaft 11. A housing 14 is splined to the shaft 10. A planet carrier 15 has a side plate 16 and a side plate 17 freely rotatably supported within the housing 14 and/or on the shafts 10 and 11. Pinion pins 18 are disposed between the side plates 16 and 17 of the planet carrier 15. Planet gears 19 are freely rotatably supported on the pins 18 between the side plates 16 and 17. The planet gears 19 mesh with the sun gear 12. A ring gear 20 is connected in the housing 14. The ring gear 20 is bolted between one half 21 and the other half 22 of the housing 14, such as by bolts 23. The planet gears 19 also mesh with the ring gear 20.

A seal 24 lies between the housing half 22 and the shaft 11 and prevents the escape of fluid between from the housing. The spline 25 of the housing half 21 and the shaft 10 are sealably inter-connected. Fluid, not shown, is contained in the housing 14. The fluid immerses the teeth of the sun gear, the planet gears 19, and the ring gear 20. The shaft 11 may have a flange 26 connected to a fly wheel 27 by bolts 28. The bolts 28 may also connect a hub 29 to the fly wheel 27 and shaft 11.

In the embodiment shown in FIG. 2, vanes 30 and 31 are located on the interior of the housing halves 21 and 22 respectively. Vanes 32 and 33 are located on the planet carrier side plates 16 and 17 respectively. Vanes 34 and 35 are located on the sides of the planet gears 19. The vanes 30, 31, 32, 33, and 34 and 35 may be used singly or in any combination with one another to increase fluid reaction between the members as desired.

The housing 14, FIG. 1, may have a trap chamber 40 adjacent the ring gear 20. This internal shape of the housing at the trap chamber 40 directs the fluid toward the teeth of the ring gear 20 and planet gears 19. The trap also opposes out flow of the fluid thus loading the teeth with fluid. Also the housing 14 may have an internal shape as seen in FIG. 3 wherein the fluid is impinged by the slanting internal side walls 41 into the location of the teeth of the ring gear 20 and planet gears 19 to impede their relative movement. The internal shape of the housing, the trap chambers, and the vanes, may be used singly and in combination to suit the designed desired characteristics of the transmission.

Reference is now made to FIGS. 4, 5, and 6 which show auxiliary means for resisting relative rotation of the planet gears and planet carrier while such relative rotation is occurring. In the device of FIG. 4 a blocking center plate 50 on the carrier 15 fits between the side plates 16 and 17 and seals off a blind cavity 51. The center plate 50 and side plates 16 and 17 seal relative to the teeth of the sun gear 12 and planet gear 19. The teeth of the sun gear 12 and planet gear 19 carry fluid into the blind cavity 51. At the point of their meshing with each other, the sun gear 12 and planet gear 19 displace the fluid between their teeth into the blind cavity 51. This creates a fluid pressure in the blind cavity 51 and in the teeth of the gears carrying fluid thereto. The pressure in the cavity 51 and in the teeth of the gears carrying fluid resists the displacement of the fluid at the point of meshing and this impedes the rotation of the planet gears tending to force the planet gears to orbit without relative rotation. Thus under conditions of maximum relative rotation between the planet gears 19 and the sun gear 12, the auxiliary blind cavity 51 produces maximum resistance to relative rotation. This provides an auxiliary booster effect especially at standing starts where it is most needed as it produces a resistance to the rotation of the planet gears 19 thereby producing drive effect.

Referring to the auxiliary device of FIG. 5, a center plate 52, and auxiliary gears 54 and 55 are mounted on the planet carrier 15. The plate 52 and gears 54 and 55 are sealed at the sides by the side plates 16 and 17. Together they create the blind cavity 53. The gear 55 meshes with the sun gear 12 and with the gear 54. The gears 54 and 55 rotate into the blind cavity 53. At the point of their meshing with each other, the fluid in their teeth is displaced into the blind cavity 53 which blocks the flow of fluid producing pressure impeding rotation of the gears 54 and 55. The impedance to the gears 54 and 55 restricts their free rotation causing them to tend to orbit without relative rotation with the sun gear 12. This produces a tendency in the planet carrier to orbit without relative rotation to the sun gear and this produces drive effect through the planet gears 19.

Referring to the auxiliary device of FIG. 6, a center plate 56, and auxiliary gears 57 and 58 are mounted on the planet carrier 15. The center plate 56 and the gears 57 and 58 are sealed at the sides by the side plates 16 and 17. Together they create the blind cavity 59. The gear 58 meshes with the ring gear 20 and with the gear 57. The gears 57 and 58 rotate into the blind cavity 59 and their teeth carry fluid into the blind cavity 59. At the point of their teeth meshing with one another, the fluid in the teeth is displaced into the blind cavity 59 which blocks the flow of fluid producing pressure impeding rotation of the gears 57 and 58. The impedance to the gears 57 and 58 restricts their free rotation causing them to tend to orbit without relative rotation with the ring gear 20. This produces a tendency in the planet carrier to orbit without relative rotation to the ring gear 20 and this produces drive effect through the planet gears 19.

Like the device of FIG. 4, the devices of FIGS. 5 and 6 produce maximum resistance to relative rotation of the planet gears 19 and the planet carrier 15 while maximum relative rotation is occurring. In other words, when it is most needed. Whereas, when the planet gears 19 and planet carrier 15 are orbiting with the sun gear 12 and ring gear 20, the auxiliary devices are inactive and do not drain any energy from the drive.

In one relationship of drive, the shaft 10 may be connected to a driving member and the shaft 11 may be connected to a driven member. Under this condition, drive is transferred from the shaft 10 to the housing 14 and ring gear 20. These rotate and cause rotation of the fluid contained in the housing with centrifugal force developing in the fluid. At the start, the shaft 11 and sun gear 12 are stationary. The relative rotation between the ring gear 20 and the sun gear 12 is absorbed by the spinning of the planet gears 19 and the rotation of the planet carrier 15. Upon centrifugal force developing in the fluid, the fluid is directed radially outwardly and forces itself between the teeth of the ring gear 20 and between the teeth of the planet gears 19. The jamming effect of the fluid under centrifugal force restricts and gradually retards the spinning of the planet gears 19 and the relative rotation of the planet carrier 15. The spinning of the planet gears 19 is thereby retarded and decreases and the sun gear 12 receives rotational driving force and starts to rotate and to turn the driven shaft 11 with the planet gears acting as drive keys between the ring gear 20 and the sun gear 12. The driven shaft 11 and sun gear 12 gradually increase their rotational speed. Upon sufficient centrifugal force being developed and the initial inertia to motion overcome in the driven members, the fluid finally prevents spinning of the planet gears 19 with the result that the planet gears are locked as drive keys between the ring gear 20 and the sun gear 12 by the fluid thereby transmitting a one-to-one drive.

In the other relationship of drive it will be understood, FIG. 1, that the driving member may be connected to the shaft 11 and the driven member connected to the shaft 10. Under this condition, drive is transmitted from the shaft 11 to the sun gear 12 which spins the planet gears and rotates the planet carrier 15. As the ring gear 20 and housing 14 are stationary at the start of drive, the planet carrier 15 rotates and the planet gears 19 spin absorbing the difference between the rotation of the sun gear 12 and the standing ring gear 20. The rotation of the planet carrier 15 and the orbiting and spinning of the planet gears 19 imparts centrifugal force to the fluid within the housing 14 driving it radially outwardly into contact with the ring gear 20 and the interior of the housing 14. Under the centrifugal force conditions developed in the fluid, the fluid packs the teeth of the ring gear 20 and the planet gears 19 impeding their free spinning and this retardation of the free spinning of the planet gears 19 and rotation of the carrier 15 imparts rotational drive to the ring gear 20, housing 14, and driven shaft 10. Upon the housing 14 and ring gear 20 rotating, additional centrifugal force is developed in the fluid packing the teeth of the ring gear 20 and planet gears 19 with more force thereby further increasing the retardation of the free spinning of the planet gears 19 and thereby imparting more drive reaction between the sun gear 12 and the ring gear 20. Upon the initial inertia of the driven parts being overcome, the centrifugal force is gradually increased until the free spinning of the planet gears 19 is completely retarded and impeded so that they act as a drive key between the sun gear 12 and the ring gear 20 thereby imparting a one-to-one drive.

The planetary gear reduction when relative rotation is occurring between the sun gear 12 and the ring gear 20 provides a mechanical advantage to being the driven member up to the speed of the driving member.

Referring now to the embodiment of FIG. 2, the shaft 10 may be the driving shaft and the shaft 11 may be the driven shaft under one condition of drive. Upon the application of drive, the shaft 10, housing 14, and ring gear 20 rotate, with the shaft 11 and sun gear 12 standing, with the planet gears 19 orbiting around the sun gear 12, and with the planet carrier 15 rotating with the spinning and orbiting planet gears. The rotation of the rotating parts developes centrifugal force in the fluid forcing it into the locations of the teeth of the ring gear 20 and planet gears 19 meshing therewith. The fluid, by packing the teeth of these gears, impedes the free rotation of the planet gears and this imparts drive from the ring gear through the planet gears as drive keys to the sun gear.

The engagement of the fluid with the vanes 30, 31 on the housing 14, the vanes 32, 33 on the carrier, and the vanes 34, 35 on the planet gears resists relative movement between these parts placing fluid force on them urging them to move at the same rotational speed without relative rotation. The fluid acts as a drive media upon these parts during their relative movement and also when rotating at the same angular rate or speed. When this occurs the planet gears are rotationally stationary on the pinion pins 18 while they orbit with the carrier 15, the ring gear 20, and housing 14 and they drive the sun gear 12 as drive keys in a one-to-one drive.

When the sun gear 12, carrier 15, and ring gear 20 rotate and the planet gears 19 orbit at the same speed with the planet gears 19 rotationally stationary the planet gears are drive keys between the ring gears 20 and the sun gear 12. The fluid also acts as a drive medium between the housing 14, ring gear 20, and vanes 30, 31 on the one hand and the carrier 15, vanes 32, 33, planet gears 19, and vanes 33, 34 on the other hand with the fluid drive supplementing and augmenting the drive key action of the planet gears 19 to the sun gear 12. It is obvious that the planet carrier 15 and the ring gear 20, when rotating at the same speed, prevent relative movement between the ring gear 20 and the planet gear 19. Also obviously under this condition, the planet gears 19 do not rotate relative to the sun gear 12 and so the sun gear 12 must rotate at the same angular rate as the ring gear 20 and planet carrier 15.

When the shaft 11 is the drive shaft and the shaft 10 is the driven shaft, FIG. 2, under the other condition of drive, upon the application of drive, the shaft 11 and sun gear 12 rotate imparting rotation to the planet gears 19 and they spin and orbit with the carrier 15 imparting rotation to the carrier 15. These parts are then rotating relative to the yet stationary ring gear 20, housing 14, and driven shaft 10. The rotation of the carrier 15, vanes 32, 33, planet gears 19, and vanes 34, 35 causes the rotational movement in the fluid developing centrifugal force in the fluid moving it radially outwardly into the teeth of the ring gear 20 and against the vanes 30, 31 on the housing 14. The resistance of the fluid on the planet gear 19, carrier 15, and the gear teeth impedes their free rotation causing drive to be imparted to the ring gear 20 and it starts to rotate gradually together with the housing 14 and shaft 10. As the housing 14 and ring gear 20 rotate and accelerate more centrifugal force is imparted to the fluid.

During the gradual increase of centrifugal force in the fluid, the fluid gradually increases its resistance to relative movement between the planet gears 19 and the ring gear 20 providing a gradual application of drive to the ring gear 20 using the planet gears 19 as drive keys between the driving sun gear 12 and the driving ring gear 20. Upon the housing 14, carrier 15, planet gears 18, and vanes 30–35 rotating at the same angular rate, the fluid holds the various parts against relative movement between one another as they rotate. Also the fluid acts as a drive medium between the various parts.

The fluid drive characteristics of the vanes 30 and 31 on the housing 14, the vanes 32 and 33 on the planet carrier 15, and the vanes 34 and 35 on the planet gears 19 are important in the embodiment of the invention shown in FIG. 2. The vanes together with the fluid form a fluid coupling between the various parts on which they are carried. The vanes 30 and 31 on the housing 14 couple with the vanes 32 and 33 on the planet gear 19 and also couple with the vanes 34 and 35 on the planet carrier 15. Under final one-to-one drive conditions and under conditions adjacent thereto, the fluid is centrifugally driven outwardly in the housing 14 in inter-locking relationship with the vanes 30–35. The fluid coupling between the vanes 30, 31 and the vanes 32, 33 tends to force the housing 14 and the planet carrier 15 to rotate at the same speed. The fluid coupling between the vanes 34, 35 and the vanes 30, 31 tends to force the vanes 34, 35 on the planet gears 19 at the vanes 30, 31 on the housing 14 to lie adjacent one another and this tends to hold the planet gears 19 rotationally stationary as they orbit with the planet gears 19 acting as drive keys between the sun gear 12 and ring gear 20.

Thus it will be understood that the vanes not only impart drive directly through the fluid between the various parts, but also impart drive through the planet gears as drive keys because the fluid action of the vanes both imparts drive and imparts resistance to planet gear rotation. At the start of drive the vanes provide means efficiently resisting relative rotation between the various parts and thereby efficiently assist in gradually initiating and gradually increasing drive. The vanes also efficiently assist in the final one-to-one drive relationship.

Various types, kinds, and combinations of fluids may be used in the transmission. These may be liquids or finely particulated solids or combinations thereof. The fluid may be water or other suitable liquids. The fluid may be a thick paste similar to caulking compound or putty. Also fibers may be added to the fluid such as asbestos fibers and/or other suitable fibers. Graphite and other materials may be added to the fluid or paste as desired. Various oils with particulated solids may be used such as graphite, calcium carbonate, or other suitable materials with or without dry lubricants such as graphite, lead stearate, and/or other suitable lubricants. Synthetic resin materials may also be used.

Thus it will be understood that the fluid embodies resistance to impede the rotation of the planet gears to lock them up as drive keys to transfer drive between the sun gear and the ring gear or conversely from the ring gear to the sun gear as desired.

The vanes 30, 31 on the internal surfaces of the housing 14, the vanes 32, 33 on the planet carrier 15, and/or the vanes 34, 35 on the planet gears 19 provide additional fluid contact drive reaction between the various parts of the transmission. Obviously, the vanes increase the efficiency of the fluid as a plastic impediment to free rotation of the planet gears between the driving and driven members and it is also obvious that less viscous fluids may be employed when the vanes are used. Thus, depending on the size and design of the vanes, relatively lighter fluids may be used to produce a drive reaction between the various parts. Conversely, a more viscous fluid may be used with the vanes to produce more fluid reaction as desired.

The auxiliary fluid trap chamber arrangements of FIGS. 4, 5, and 6 may be used singly and in combination with the embodiments of the transmission shown in FIGS. 1, 2, and 3. They provide desirable booster effect during periods of greatest relative rotation between the various parts, Such as for example at standing starts. The efficiency of their operation for this purpose is very good as they drop out as boosters after relative rotation is eliminated obviating their being a drain on the energy of the drive.

The novel transmission is extremely simple, efficient, inexpensive, and produces a gradual drive between the driven parts from a standing start to full one-to-one drive with gradual torque, acceleration, and drive characteristics comparable to much more expensive and intricate transmissions.

While only a few embodiments of the novel device have been disclosed and described in detail, it is obvious that many changes may be made in the size, shape, detail, and arrangements of the various elements in the invention within the scope of the appended claims.

I claim:

1. A drive transmission device for automatically gradually transferring drive from a driving member to a driven member comprising:
   a sun gear;
   planet gears meshing with said sun gear;
   a planet carrier rotatably supporting and positioning said planet gears;
   a ring gear surrounding and meshing with said planet gears;
   a housing on said ring gear enclosing said ring gear and planet gears;
   said planet carrier and planet gears being freely rotatably supported relative to said sun gear and ring gear with said planet gears dissipating drive reaction by free rotation between a driven member and a rotating driving member;
   said housing being adapted to contain fluid for resisting the free rotation of said planet gears relative to said ring gear and said sun gear to develop drive reaction by resisting rotation of said planet gears;
   said device being connectable in a drive with a shaft connected to said sun gear, and a shaft connected to said housing and ring gear with one said shaft being connectable to a driving member and the other said shaft being connectable to a driven member;
   the fluid in said housing lying in the teeth of said ring gear and planet gears providing resistance to the rotation of the planet gears thereby providing the drive reaction necessary to turn the driven shaft with the required torque;
   said device transmitting drive between said sun gear and said ring gear in either direction through said planet gears by the fluid resisting free rotation of said planet gears causing said planet gears to act as drive keys between said sun gear and said ring gear, initially to permit relative rotation between driving and driven members, subsequently to gradually and increasingly develop application of drive, and finally to prevent planet gear spinning resulting in direct drive, and
   vanes on the interior of said housing extending to a point adjacent to said planet carrier and said planet gears to increase fluid reaction between said housing, planet gears, and sun gear to increase fluid impedance to relative rotation therebetween thereby augmenting transfer of drive between said driving and driven members by tending to prevent relative rotation of the planetary set.

2. A drive transmission device for automatically gradually transferring drive from a driving member to a driven member comprising:
   a sun gear;
   planet gears meshing with said sun gear;
   a planet carrier rotatably supporting and positioning said planet gears;
   a ring gear surrounding and meshing with said planet gears;
   a housing on said ring gear enclosing said ring gear and planet gears;
   said planet carrier and planet gears being freely rotatably supported relative to said sun gear and ring gear with said planet gears dissipating drive reaction by free rotation between a driven member and a rotating driving member;
   said housing being adapted to contain fluid for resisting the free rotation of said planet gears relative to said ring gear and said sun gear to develop drive reaction by resisting rotation of said planet gears;
   said device being connectable in a drive with a shaft connected to said sun gear, and a shaft connected to said housing and ring gear with one said shaft being connectable to a driving member and the other said shaft being connectable to a driven member;
   the fluid in said housing lying in the teeth of said ring gear and planet gears providing resistance to the rotation of the planet gears thereby providing the drive reaction necessary to turn the driven shaft with the required torque;
   said device transmitting drive between said sun gear and said ring gear in either direction through said planet gears by the fluid resisting free rotation of said planet gears causing said planet gears to act as drive keys between said sun gear and said ring gear, initially to permit relative rotation between driving and driven members, subsequently to gradually and increasingly develop application of drive, and finally to prevent planet gear spinning resulting in direct drive, and
   vanes on said planet carrier extending to a point adjacent to said housing and said planet gears to increase fluid reaction between said planet carrier, housing and planet gears to increase fluid impedance to relative rotation therebetween thereby augmenting transfer of drive between said driving and driven members by tending to prevent relative rotation between the planetary set.

3. A drive transmission device for automatically gradually transferring drive from a driving member to a driven member comprising,
   a sun gear;

plane gears meshing with said sun gear;

a planet carrier rotatably supporting and positioning said planet gears;

a ring gear surrounding and meshing with said planet gears;

a housing on said ring gear enclosing said ring gear and planet gears;

said planet carrier and planet gears being freely rotatably supported relative to said sun gear and ring gear with said planet gears dissipating drive reaction by free rotation between a driven member and a rotating driving member;

said housing being adapted to contain fluid for resisting the free rotation of said planet gears relative to said ring gear and said sun gear to develop drive reaction by resisting rotation of said planet gears;

said device being connectable in a drive with a shaft connected to said sun gear, and a shaft connected to said housing and ring gear with one said shaft being connectable to a driving member and the other said shaft being connectable to a driven member;

the fluid in said housing lying in the teeth of said ring gear and planet gears providing resistance to the rotation of the planet gears thereby providing the drive reaction necessary to turn the driven shaft with the required torque;

said device transmitting drive between said sun gear and said ring gear in either direction through said planet gears by the fluid resisting free rotation of said planet gears causing said planet gears to act as drive keys between said sun gear and said ring gear, initially to permit relative rotation between driving and driven members, subsequently to gradually and increasingly develop application of drive, and finally to prevent planet gear spinning resulting in direct drive, and vanes on said planet gears sidewise of their teeth projecting from said planet gears toward said planet carrier to a point adjacent said planet carrier when rotating within said planet carrier and to a point adjacent said housing when rotating outside said planet carrier to increase fluid reaction between said planet gears, planet carrier, and housing to increase fluid impedence to relative rotation therebetween thereby augmenting transfer of drive between said driving and driven members by tending to prevent relative rotation between the planetary set.

4. A drive transmission device for automatically gradually transferring drive from a driving member to a driven member comprising, a sun gear;

planet gears meshing with said sun gear;

a planet carrier rotatably supporting and positioning said planet gears;

a ring gear surrounding and meshing with said planet gears;

a housing on said ring gear enclosing said ring gear and planet gears;

said planet carrier and planet gears being freely rotatably supported relative to said sun gear and ring gear with said planet gears dissipating drive reaction by free rotation between a driven member and a rotating driving member;

said housing being adapted to contain fluid for resisting the free rotation of said planet gears relative to said ring gear and said sun gear to develop drive reaction by resisting rotation of said planet gears;

said device being connectable in a drive with a shaft connected to said sun gear, and a shaft connected to said housing and ring gear with one said shaft being connectable to a driving member and the other said shaft being connectable to a driven member;

the fluid in said housing lying in the teeth of said ring gear and planet gears providing resistance to the rotation of the planet gears thereby providing the drive reaction necessary to turn the driven shaft with the required torque;

said device transmitting drive between said sun gear and said ring gear in either direction through said planet gears by the fluid resisting free rotation of said planet gears causing said planet gears to act as drive keys between said sun gear and said ring gear, initially to permit relative rotation between driving and driven members, subsequently to gradually and increasingly develop application of drive, and finally to prevent planet gear spinning resulting in direct drive, and vanes on the interior of said housing extending toward said planet carrier and said planet gears, vanes on said planet gears sidewise of their teeth extending toward said vanes on said housing; and vanes on said planet carrier extending toward said vanes on said housing and said vanes on said planet gears when outside said planet carrier;

all said vanes projecting to a point adjacent one another to increase fluid reaction between said vanes to increase fluid impedance to relative rotation between said housing, planet gears, and planet carrier thereby augmenting transfer of drive between said driving and driven members by tending to prevent relative rotation between the planetary set.

References Cited

UNITED STATES PATENTS

| | | | |
|---|---|---|---|
| 1,752,385 | 4/1930 | Johnson | 74—774 |
| 2,019,849 | 11/1935 | Foster | 74—774 |
| 2,246,450 | 6/1941 | McGavern | 74—774 |
| 2,371,227 | 3/1945 | Dodge | 192—61 |
| 2,371,228 | 3/1945 | Dodge | 192—61 X |
| 2,406,612 | 8/1946 | Landrum | 192—61 |
| 2,468,964 | 5/1949 | Dunn et al. | 74—774 X |
| 2,678,710 | 5/1954 | Sterne | 192—61 |
| 2,727,608 | 12/1955 | Smith | 192—61 |
| 2,743,628 | 5/1956 | Scharaffa | 192—61 X |
| 3,258,093 | 6/1966 | Ahlen | 192—61 |

FOREIGN PATENTS 965,733  8/1964  Great Britain.

DONLEY J. STOCKING, *Primary Examiner.*

DAVID J. WILLIAMOWSKY, *Examiner.*

J. R. BENEFIEL, *Assistant Examiner.*